May 27, 1958 J. H. STROOP 2,836,291
EDIBLE STRIP PACKAGE AND METHOD OF MAKING SAME
Filed Aug. 13, 1956 2 Sheets-Sheet 1
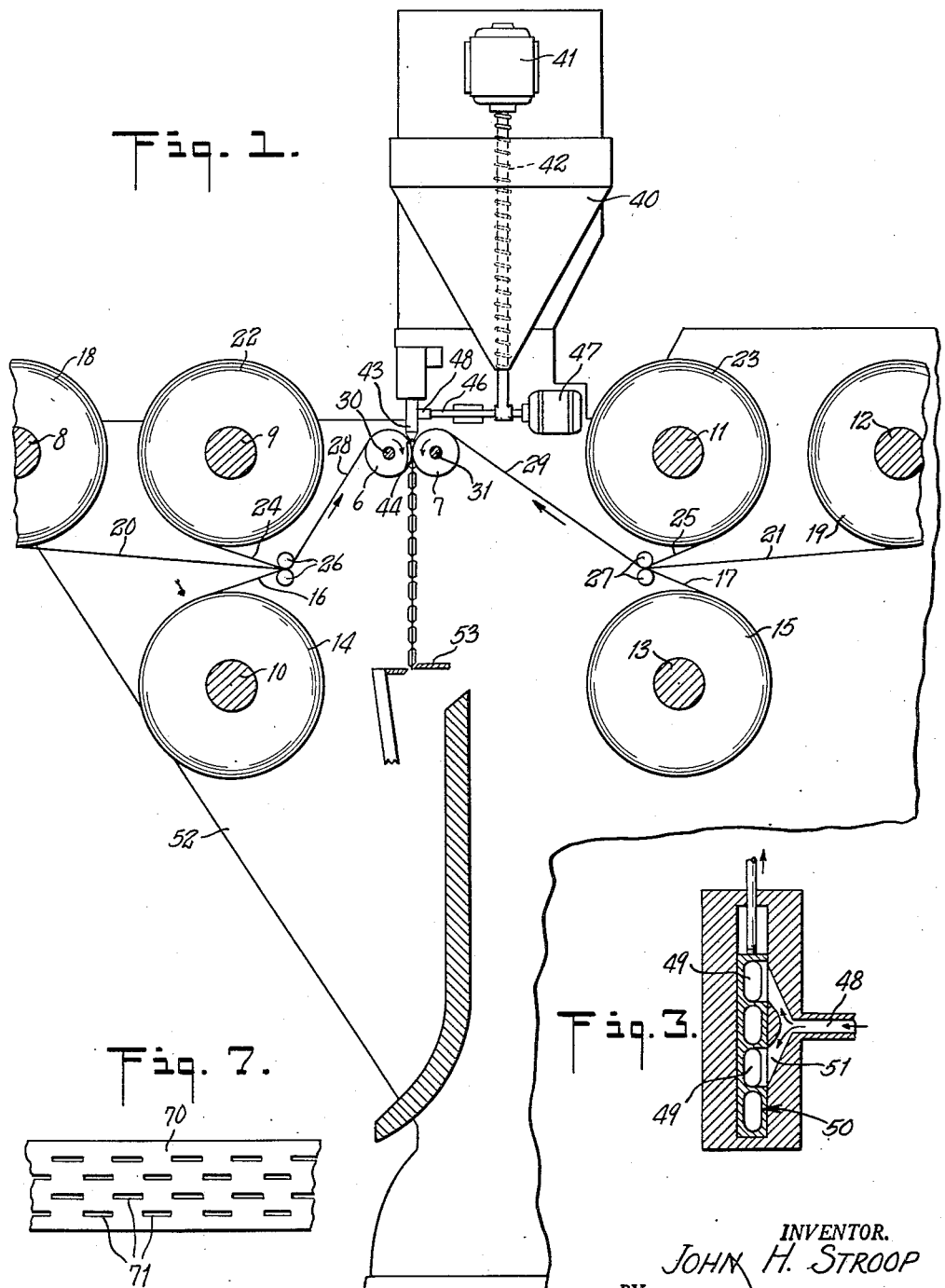
INVENTOR.
JOHN H. STROOP
BY
ATTORNEY May 27, 1958     J. H. STROOP     2,836,291
EDIBLE STRIP PACKAGE AND METHOD OF MAKING SAME
Filed Aug. 13, 1956     2 Sheets-Sheet 2
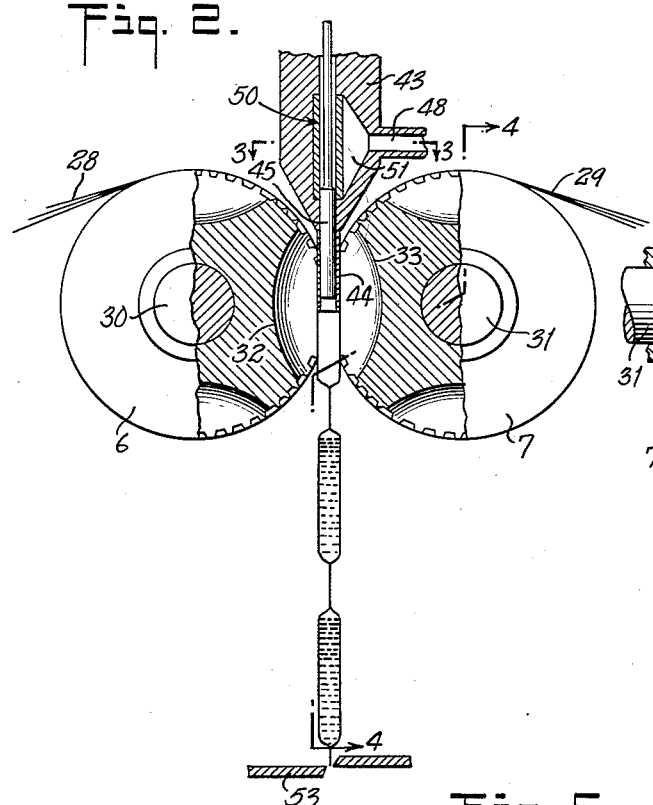
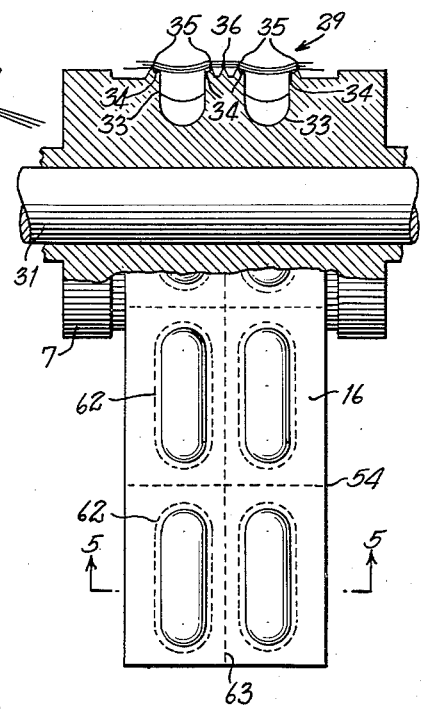
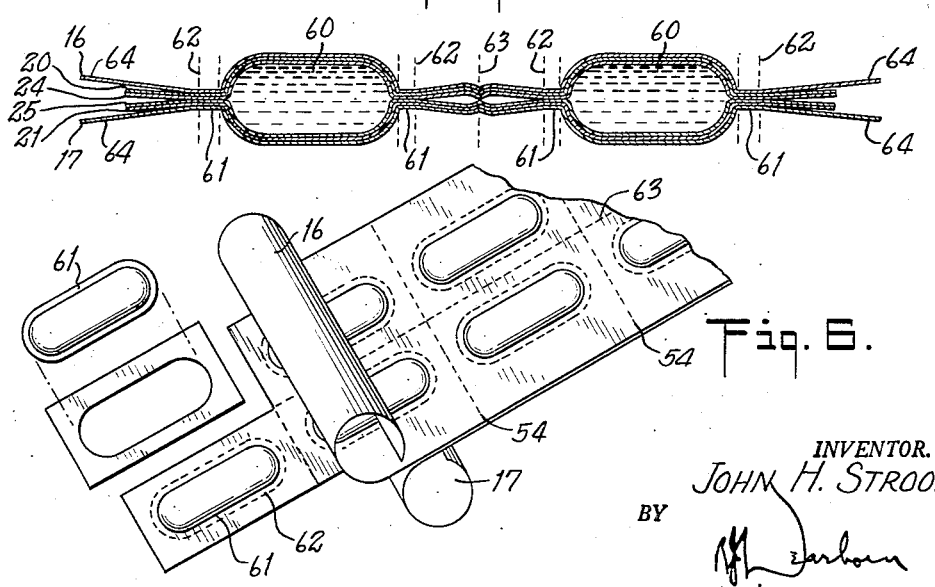
INVENTOR.
JOHN H. STROOP
BY
ATTORNEY

2,836,291
EDIBLE STRIP PACKAGE AND METHOD OF MAKING SAME

John H. Stroop, New York, N. Y., assignor to The Pad-Y-Wax Company, Inc., New York, N. Y., a corporation of New York Application August 13, 1956, Serial No. 603,777

9 Claims. (Cl. 206—56)

This application is a continuation-in-part of my application Serial No. 386,370, filed October 15, 1953, now abandoned.

This invention pertains to strip packages and the methods of making them. It is particularly concerned with the packaging of measured quantities of drugs and medicines or food products which are normally in the form of liquid, semi-liquid, or powder.

The manufacture of capsules containing foods or medicines with an outer coating of gelatinous material or other edible covering has long been known and in use. Such capsules, candies or the like require a distinct and separate operation for packaging them or putting them up in bottles, boxes or containers. Inasmuch as the outer coating or covering of the capsule or edible unit is consumed by the patient or user, it is highly desirable that it should have a protective coating which is airtight and which is not removed except just at the time that the capsule is taken orally.

One of the most satisfactory methods of protecting capsules and the like has been to utilize a strip packaging machine such as, for example, those shown and described in my Patents Nos. 2,608,809 and 2,670,581, issued to the Pad-Y-Wax Company, Inc., on September 2, 1952, and on March 2, 1954, respectively. Such machines have been extensively employed for packaging pills, pellets or capsules, and this operation is carried on in many cases at high speed so that more than 500 pills, pellets or capsules are packaged in one minute.

It is evident to those skilled in this art that the manufacture of the pills, pellets and capsules has been one distinct operation and the strip packaging has been another distinct operation, whereas the primary object of my present invention is to manufacture the capsule or pellet and, as a part of the same operation, to provide an outer removable protective covering whereby the final package may be produced at great speed in one operation.

Thus, by the use of my invention it is possible to start with powdered chemicals, granular edible substances or the like and to feed such materials directly through a feed mechanism embodying exact measuring pockets, the contents of each pocket being fed one at a time into the machine, which is adapted to supply not only an inner edible container for each measured quantity of medicine or substance being packaged, but also simultaneously to provide a readily removable outer sealed covering in the same operation.

The inner edible covering containing the medicinal or food substance is preferably strongly sealed and the outer protective covering is lightly sealed so that the user can very readily remove the outer coating without damaging the inner edible package in which the medicine or food substance is contained.

It is also preferable that the outer strip covering be made of greater width than the inner covering so that the edges of the outer, lightly sealed, removable covering can be easily grasped and taken off without difficulty.

According to this invention the strip package is composed of edible strips which may be made of well known gelatinous material but which preferably are formed of very thin, strong films which readily dissolve and have no deleterious effect when the inner package is consumed. Several substances are available which have these characteristics, among which are a methyl cellulose film, a polyvinyl alcohol film, a carboxy methyl cellulose film, and an elvanol polyvinyl film.

In carrying out this invention it is preferable to manufacture the inner package in multiple and to provide not only for the sealing of the individual packages but also for their ready segregation into small sealed packages containing a single dosage or measured quantity of liquid, semi-liquid or power which may be conveniently swallowed by the patient or the user of the product. The package of this invention is provided with outer strips which are adapted to protect the edible strips, but which can be readily separated or peeled off and discarded just before the inner package containing the edible strips is consumed.

This invention has the great advantage of producing edible packages containing liquid, semi-liquid, or powdered material, which are much more economical and more sanitary than the usual capsule which hitherto has been produced and either dispensed in bottles or other containers or is first produced and then sealed in strip packages as a separate operation.

Another object of my invention is to provide an edible package having a pair of inner quick dissolving strips, a pair of intermediate delayed action strips and a pair of outer protective strips. The intermediate delayed action strips may be made of the same material as described for the inner quick dissolving strips, but somewhat thicker, or they may be made of similar material having very fine slots. Thus the dosage of medicine sealed between the strips is fully protected, until ready for use, by the outer protective strips, and the patient may remove only the protective strips and swallow the medicine together with the inner strips and the delayed action strips and thereby, when desired, assure that the medicine will take effect beyond the stomach.

On the other hand, the patient may remove both the protective strips and the delayed action strips and take the medicine contained only in the inner quick dissolving strips.

This arrangement will enable the doctors to prescribe both the medicine and the way it is to be taken, depending upon the requirements of the patient.

In case the medicine is only intended to be absorbed in the system beyond the stomach, the package may be made up of only the delayed action strips and the protective outer strips.

In certain cases an additional pair of strips, at least one of which is slotted, may be employed to give a metering effect by gradually dispensing of the contents of the package as it passes through the system of the patient. The strips of the different character described may all be used in making a strip package or one or more may be selected and used as desired. The outer protective strips preferably will be used in all cases.

Preferably the outer protective strips are lightly sealed to the edible strips and to each other so that they may be easily removed without damaging the inner edible strips which are very tightly or firmly sealed to each other to avoid the possibility of being ruptured or torn with a consequent loss of the medicinal or food substance packaged. As an example, the outer protective strips may be simply pressure-sensitive strips, e. g. various well known cellophane tapes.

Each set of strips are united as they are drawn from the individual web spools and constitute in substance a multiply strip, two of which are used in the strip packaging machine to produce the finished article.

Referring to the drawings:

Fig. 1 is a diagrammatic outline elevation of a packaging machine which illustrates the features employed in producing the edible package and in carrying out the method of this invention;

Fig. 2 is an enlarged partially sectional elevation showing particularly the rotary dies, mandrel and feed plunger;

Fig. 3 is a sectional plan view on the line 3—3 of Fig. 2;

Fig. 4 is a partial section on the line 4—4 of Fig. 2 showing one of the rotary dies broken away and a portion of the strip package being formed;

Fig. 5 is a still larger section of the strip package on the line 5—5 of Fig. 4;

Fig. 6 shows the package strip partially in perspective with the outer protective plies or strips rolled back, and Fig. 7 shows a portion of a metering strip.

The machine shown in Figs. 1, 2, 3 and 4 comprises a pair of rotary dies 6 and 7, spools or bobbins 8, 9 and 10, and 11, 12 and 13, web rolls 22 and 23 mounted on bobbins 9 and 11 and are composed of inner edible plies or strips, web rolls 18 and 19 mounted on bobbins 8 and 12 are composed of intermediate strips which may have a delayed action as hereinafter described, and webs 14 and 15 which are mounted on bobbins 10 and 13 are composed of outer protective plies or strips.

The three strips 16, 20 and 24 are led over guide rolls 26 and strips 17, 21 and 25 are led over guide rolls 27, so that the plies are united but not sealed together, to form multiply strips 28 and 29, which are led from the guide rolls 26 and 27 onto the rotary dies 6 and 7, and are partially wrapped around these dies which are heated in the usual manner and are formed and heat sealed as they pass through the dies.

If the strips are not adapted for heat sealing and are susceptible of being water sealed, then dampening means will be mounted to moisten each of the individual plies at the areas where sealing is desired. Timed applicator dies each having surface indentures where the sealing is not desired may be used to accomplish this result in a well known manner. The outer protective strip may be water sealed and the inner edible strip heat sealed. In fact, this is a very satisfactory way of making the seal in the protective strips a light or easily ruptured seal relative to the heat seal of the inner edible plies.

The outer protective strips may be made of paper with a thin coat of gum which adheres as the strips pass through the die rolls of the packaging machine and thus be lightly sealed; i. e. the seal may be easily ruptured without damage to the inner edible strips which are formed of thermoplastic or gelatinous material and are very firmly or strongly sealed by the heat imparted to them as they pass over the die rolls.

Rotary dies 6 and 7, as shown in Figs. 2 and 4, are mounted on stationary shafts 30 and 31 and have a plurality of circumferentially spaced pockets 32 and 33, which register, so as to permit the packages to be formed and filled. Each of the rotary dies, as shown in Fig. 4, has two pockets spaced axially of the rotary die but may have either a single set of pockets or two or more, as desired. The die is formed with sealing surfaces 34, adjacent to the pockets, to heat seal the multiply strip package at the edge of the pocket. The dies are also provided with toothed or serrated perforating surfaces 35 next to the sealing surfaces 34 and in the center, between the two pockets, there is another perforating surface 36. While rotary die 7 is shown in Fig. 4, the die 6 is formed exactly to correspond so that the two cooperate in the production of the packages. One of the multiply strips 29 is shown in Fig. 4 as it wraps around the rotary die 7.

Referring now to Figs. 1, 2, 3 and 4, the machine has a feed hopper 40 with some suitable device for advancing the contents of the hopper, such as motor 41 and auger 42 operated thereby, and a transfer feed screw 46 operated by motor 47, which delivers the material to be packaged through tube 48 into measuring pockets 49 of a shuttle 50 in chamber 51.

From an examination of the mechanism illustrated it will be clearly understood that the pockets 49 of the shuttle 50 are made of a desired or predetermined size so that an exactly measured quantity of the medicine or food substance to be packaged will fill the pockets and in turn be delivered into the strip packaging machine and constitute the ultimate desired quantity in each of the final inner packages.

The machine also has a hollow mandrel 43 which is reciprocated and has a tubular extension 44 in which a feed plunger 45 is mounted. Through the hollow mandrel the plunger forces the measured quantity of material to be packaged downward through the hollow mandrel extension 44 and between the package strips 28 and 29 just as they are passing over a pair of the pockets, such as 32 and 33 of the rotary dies.

The arrangement of parts and the timing of the reciprocating mandrel and of the feed plunger are such that the hollow tubular extension 44 of the hollow mandrel spreads the webs 28 and 29 to preform pockets therein. The lower half of each pocket thus formed is sealed and the measured quantity of the material to be packaged enters the pocket of the strip package and the mandrel is withdrawn in time to avoid conflict with the edges of the pockets 32 and 33.

52 represents the frame of the machine on which the rotary dies, the bobbins and various parts are mounted. 53 indicates a cutting knife which may be operated to sever the strip package along any one of the transverse perforation lines 54.

The timing of the knife which is operated by a cam (not shown) in the usual manner may be set to sever the packages into single or double groups, or in multiple, depending on the requirements of the trade and the desires of the manufacturer.

Referring specifically to Figs. 5 and 6, which are enlarged to show clearly the inner edible plies 24 and 25, the intermediate plies 20 and 21 and the outer protective plies 16 and 17, the material packaged is indicated at 60, the sealed zones are shown in Fig. 5 at 61 and the perforating lines are shown at 62. The central transverse perforation, which may be the cutting line, also is shown at 63, the outer protective plies 16 and 17, are preferably made wider so that they have unsealed ends 64 to provide for the ready removal of the outer protective plies when the inner material in the package is being taken or used.

As shown in Fig. 6, several parts of packages are left on the section of the strip between cuttings and the outer protective plies 16 and 17 rolled back so as to expose a part of the sealed medicinal packages, one of which has been torn away from the strip along the perforated lines and is ready to be consumed. The entire rectilinear package may be consumed without removing the capsule shaped individual units; in other words, flat pillows of multiple unit dosage may be utilized without further separation.

It is also equally possible to tear the individual units from the strip package with the protective outer ply still in place but ready to be removed at the time the unit is consumed.

Referring to Fig. 7, a portion of a metering strip 70 which is provided with slots 71 is shown to illustrate one means of providing a delayed action which may result in a distribution or metering of the medicinal effect. This strip may be substituted for the intermediate delayed action strip above described, or it may be added as a separate strip or ply.

The foregoing description is intended to be illustrative only and variations may be made by those skilled in the art without departing from the spirit of the invention. Hence I desire that only such limitations be imposed as are set forth in the appended claims.

What I claim:

1. A multiply strip package, formed by a single continuous operation, having an inner pair of edible plies containing spaced measured quantities of a medicinal or food substance, strongly sealed by the application of heat entirely around each quantity and outer protective plies lightly sealed by the application of pressure to the inner plies for ready removal therefrom.

2. A strip package for medicinal substances, formed by a single continuous operation, which comprises a pair of laminated strips, each composed of an edible strip susceptible of being strongly sealed and a wider protective strip susceptible of being lightly sealed to the edible strip, a series of sealed pockets containing measured quantities of the medicinal substance to be packaged, said wider protective strips being unsealed at their outer edges to provide grip extensions to facilitate removal thereof.

3. A multiply strip package, formed by a single continuous operation, having an inner pair of edible plies containing spaced measured quantities of a medicinal or food substance, strongly sealed entirely around each quantity and outer protective plies lightly sealed to the inner plies for ready removal therefrom, and perforations between each spaced quantity of medicinal or food substance extending to at least one edge of the multiply strips, whereby a single sealed quantity may be readily broken loose from the strips without interfering with the seal, and whereby the outer ply may be readily removed by the user before consuming the substance.

4. A strip package for medicinal substances, formed by a single continuous operation, which comprises a pair of laminated strips each composed of an inner edible strip and intermediate delayed action strip, which is harmless to the human system, and a readily removable outer protective strip, and a series of sealed pockets of medicinal substance within the inner edible strips whereby the patient may either remove the outer protective strip and consume the medicine wrapped in the inner edible strip and delayed action strip, or at will may remove both the outer protective strip and the delayed action strip before swallowing.

5. A method of forming and filling edible strip packages with a removable outer protective ply in a single continuous operation which consists in mounting a corresponding number of web rolls on each side of a pair of cooperating rotary dies, one of the web rolls on each side being composed of an edible strip, and one composed of a protective strip, continuously feeding said webs on to said rotary dies so that the protective strips are adjacent the surface of the dies and the edible strips are spaced from the surface of the dies by the intermediate strips, preforming pockets between said sets of strips without interrupting the continuous operation, introducing measured quantities of medicine into each pocket as formed, and sealing the edible strips around each measured quantity of medicine and sealing the protective strips to the edible strips without preventing the ready removal of the protective strips independently of the edible strips.

6. A method of forming and filling edible strip packages which consists in mounting a corresponding number of web rolls on each side of a pair of cooperating rotary dies, one of the web rolls on each side being composed of an edible strip susceptible of being strongly sealed by the action of the web rolls, one on each side being composed of a delayed action strip and one on each side composed of a protective strip susceptible of being lightly sealed, continuously and simultaneously feeding said webs on to said rotary dies so that the protective strips are adjacent the surface of the dies and the edible strips are spaced from the surface of the dies by the intermediate strips, preforming pockets between said sets of strips, introducing measured quantities of medicine immediately before they contact the rotary dies, into each pocket as formed, sealing the inner edible plies around each measured quantity of medicine by the application of heat and perforating the multiply strips between each quantity of medicine and around each quantity of medicine outside of the seals, whereby the individual quantity of medicine may be broken away from the strip package without interfering with its individual seal, and whereby the outer protective film may be removed without disturbing the intermediate and edible strips.

7. The method of forming and filling edible strip packages with removable non-edible outer protective strips in single continuous operation, which consists in feeding continuously two multiply strips each composed of at least one inner edible ply of heat-sealable material and an outer removable protective ply of non-edible material susceptible of being lightly sealed to the inner edible ply by the application of pressure, between rotary dies having circumferentially spaced openings, preforming pockets in the strips, feeding measured quantities of medicine in succession into said preformed pockets, heating the rotary dies, and subjecting the multiple strips to heat and pressure around each measured quantity of medicine so that the outer non-edible plies are lightly sealed to the inner edible plies and may be removed without damage to the package composed of the medicine and the inner plies.

8. The method of forming and filling edible strip packages with removable non-edible outer protective strips in single continuous operation, which consists in feeding continuously two multiply strips each composed of a relatively wide outer removable protective ply of non-edible material susceptible of being lightly sealed to the inner edible ply; and at least one inner edible ply of heat fusible material between rotary dies having circumferentially spaced openings, reciprocating a mandrel in timed relation to the rotary dies to momentarily enter each of the spaced openings in the dies between the multiple strips and preform pockets in the strips, feeding measured quantities of medicine in succession into said preformed pockets, heating the rotary dies, fusing the inner edible plies together and pressure sealing the outer non-edible plies to the adjacent inner edible plies.

9. The method of forming and filling edible strip packages with removable non-edible outer protective strips in single continuous operation, which consists in feeding continuously two multiply strips each composed of a relatively wide outer removable protective ply of non-edible material and at least one inner edible ply of heat fusible material between rotary dies having circumferentially spaced openings, reciprocating a mandrel in timed relation to the rotary dies to momentarily enter each of the spaced openings in the dies between the multiple strips and preform pockets in the strips, feeding measured quantities of medicine in succession into said preformed pockets, heating the rotary dies, fusing the inner edible plies together and lightly sealing the outer non-edible plies together, said non-edible outer plies being wider than the inner edible plies and extending beyond the heated cooperative pressure surfaces of the dies to form extensions which are not fused or sealed and may readily be gripped to remove the outer non-edible strips from the finished packages.

References Cited in the file of this patent

UNITED STATES PATENTS

| 1,895,899 | Schaub | Jan. 31, 1933 |
| 2,099,402 | Keller | Nov. 16, 1937 |
| 2,141,318 | Salfisberg | Dec. 27, 1938 |
| 2,155,444 | Pittenger et al. | Apr. 25, 1939 |
| 2,248,471 | Stroop | July 8, 1941 |
| 2,257,823 | Stokes | Oct. 7, 1941 |
| 2,260,064 | Stokes | Oct. 21, 1941 |
| 2,318,718 | Scherer | May 11, 1943 |

OTHER REFERENCES

Drug and Cosmetic Industry, vol. 63, October 1948, page 431.